(12) United States Patent
Futase

(10) Patent No.: US 7,381,457 B2
(45) Date of Patent: Jun. 3, 2008

(54) STRUCTURE, METHOD, AND DEVICE FOR SPLICING LAMINATED FILMS

(75) Inventor: Katsunori Futase, Saitama (JP)

(73) Assignee: Taisei Lamick Co., Ltd., Saitama (JP)

( * ) Notice: Subject to any disclaimer, the term of this patent is extended or adjusted under 35 U.S.C. 154(b) by 0 days.

(21) Appl. No.: 10/362,974

(22) PCT Filed: Aug. 30, 2001

(86) PCT No.: PCT/JP01/07497

§ 371 (c)(1),
(2), (4) Date: Mar. 6, 2003

(87) PCT Pub. No.: WO02/24436

PCT Pub. Date: Mar. 28, 2002

(65) Prior Publication Data

US 2003/0173022 A1    Sep. 18, 2003

(30) Foreign Application Priority Data

Sep. 20, 2000 (JP) ............................. 2000-285690
Dec. 15, 2000 (JP) ............................. 2000-382348

(51) Int. Cl.
*B32B 3/00* (2006.01)
(52) U.S. Cl. .......................... 428/57; 428/121; 428/53; 428/35.2; 428/34.3; 428/34.7
(58) Field of Classification Search ................ 428/121, 428/57, 53, 35.2, 34.3, 34.7
See application file for complete search history.

(56) References Cited

U.S. PATENT DOCUMENTS 3,394,045 A * 7/1968 Gould ........................ 428/337
4,872,590 A   10/1989 Sasaki et al. ............... 220/457

FOREIGN PATENT DOCUMENTS

| JP | 38-25685 | 11/1963 |
| JP | 48-4388  | 2/1973  |
| JP | 55-46178 | 11/1980 |
| JP | 61-72524 | 4/1986  |
| JP | 63-7519  | 1/1988  |
| JP | 5-4995   | 2/1993  |

OTHER PUBLICATIONS

English Language Abstract of JP 61-72524.
English Language Abstract of JP 63-7519.
English Language Abstract of JP 55-46178.
English Language Abstract of JP 38-25685.
English Language Abstract of JP 48-4388.
English Language Abstract of JP 5-4995.

* cited by examiner

*Primary Examiner*—Jane Rhee
(74) *Attorney, Agent, or Firm*—Greenblum & Bernstein, P.L.C.

(57) ABSTRACT

A coupled portion of mutual laminate films sufficiently contributes to the formation of a packaging bag in that the coupled portion itself has excellent airtightness and liquid tightness. The tensile strength required for the laminate film is given to the coupled portion, whereby a temporary stop of a packaging apparatus is useless when a connecting portion of the laminate film is passed through the apparatus, thereby enhancing the operation efficiency and improving the yield of the material. Oriented base film layers are joined in a miter form at the coupled portion between a rear end portion and a front end portion of laminate films comprising oriented base film layers and sealant layers.

3 Claims, 11 Drawing Sheets

Enlarged section view of A portion

Biaxially oriented nylon film layer face

Polyethylene layer face

STRUCTURE, METHOD, AND DEVICE FOR SPLICING LAMINATED FILMS

TECHNICAL FIELD

This invention relates to a coupling structure, a coupling process and a coupling apparatus of coupling a rear end portion of one laminate film with a front end portion of another laminate film without using an adhesion tape or the other coupling material in laminate films, frequently a laminate film used for packaging, in which a mutually coupled portion of the laminate films is also subjected to liquid-tight or airtight heat sealing likewise the other portion in the bag formation or the like through heat sealing.

BACKGROUND ART

For instance, a laminate film for packaging used for the production of a package bag filled with a material to be packed, which is used in a case of continuously filling and packaging a liquid body, a powdery body or other or a case of discontinuously filling and packaging it, is generally applied to a packaging apparatus at a state of roll-shaped winding through a printing step, a laminating step and a slitter step.

In this case, the slitter step is mainly carried out for cutting and removing side portions of a laminate film to render a width size of the film into a constant value, and adjusting a length of the laminate film wound in roll shape and coupling the laminate films so as to render a total winding length of the laminate film into a given length such as 1000 m, 2000 m or the like, and connecting the laminate films to each other after the cut removal of poor printed portion, poor laminated portion and the like. For this end, 2-3 film coupled portions are frequently existent in the wound laminate film of 2000 m.

Heretofore, the coupling of the laminate films each comprising a base film layer and a sealant layer is carried out by butting a rear end of one laminate film to a front end of another laminate film through an adhesion tape or the like attached to a side of a base film face and joining them.

In the thus coupled laminate film, however, when the laminate film is subjected to longitudinal sealing and lateral sealing at a two folded state in a widthwise direction to form a packaging bag under a fusion of the sealant layer, the adhesion tape or the like made of a material different from the laminate film brings about the increase of the thickness of the laminate film, and also a sufficient heat transmission from a heat sealing blade to the sealant layer is obstructed by the properties inherent to the adhesion tape or the like and hence it is substantially impossible to rapidly melt the sealant layer to an extent enough to the fusing between the mutual sealant layers. For this end, when the continuous filling, packaging and the like are carried out, for example, by applying the laminate film to the packaging apparatus, even if the film coupled portion existing in the free end portion of the folded laminate film could be passed between longitudinal heat sealing blades as a pair of rotational sealing blades rotating at a constant clearance as it is, the sealant layer can not be sufficiently heat-fused even under a heating and pressurizing action of the longitudinal heat sealing blade due to the presence of the adhesion tape or the like, and hence there is a problem that leakage, scattering and the like of the liquid or other material to be packed is caused.

The similar result is also caused by joining with the adhesion tape or the like because end portions of both laminate films can be coupled to each other at a strength required in a packaging bag with a sufficient airtightness or liquid tightness.

Heretofore, the whole of the packaging apparatus or a main part thereof such as heat sealing function part, filling function part and the like is temporarily stopped every the running-out of the coupled portion of the laminate film from the wound film and the coupled portion is passed through the main part of the apparatus and thereafter the filling and packaging are restarted. In the restarting, affirmation of amount of material to be packed in the packaging bag, confirmation of heat sealing position and sealed state, confirmation of cutting position of the packaged bag and forming position of tear notch, and so on are conducted to put all of them into acceptable ranges, and thereafter the apparatus is really re-worked.

Therefore, many times and operating numbers are required form a temporary stop of the apparatus or a main function part thereof to a re-working of the apparatus, which cause a serious problem in the working capacity and efficiency, while it is obliged to consume greater amounts of the laminate film and the material to be packed, which causes a problem of lowering the material yield.

For this end, the invention provides a coupling structure, a coupling method and a coupling apparatus of a laminate film, in which end portions or side portions of laminate films are coupled to each other without using a coupling material such as an adhesion tape or the like and the resulting coupled portion is sufficiently contributed to make a packaged bag likewise the other portion of the laminate film and also a tensile strength required in the laminate film is given to the coupled portion, whereby the capacity and efficiency of the filling and packaging work for the material to be packed can effectively be enhanced and the yield of the material can be largely improved.

DISCLOSURE OF THE INVENTION

A coupling structure of a laminate film according to the invention is a structure that laminate films each comprising a thermoplastic oriented base film layer such as a biaxially oriented nylon film layer, a biaxially oriented polyester film layer, a biaxially oriented polypropylene film layer, a biaxially oriented ethylene-vinyl alcohol copolymer film layer or the like and a sealant layer such as various polyethylene layers, an ethylene-vinyl acetate copolymer layer, a non-oriented polypropylene, an ethylene-acrylic acid copolymer layer, an ionomer layer or the like are mutually coupled at each front end portion and rear end portion to each other, and mutual oriented base film layers are fusion-joined in a mitre form and a protruding amount of the fusion joint portion from the other film portion is about 50-800 µm.

In the invention, various film layers, or a metal foil such as aluminum foil or the like, a paper, various vapor deposited layers, a vinylidene chloride copolymer coating layer, or other coating layer may be interposed between the oriented base film layer and the sealant layer.

The above coupling structure of the laminate film can be realized, for example, by overlapping both the laminate films so as to oppose their oriented base film layers to each other and hot-cutting these laminate films with an impulse sealer, preferably under a pressure to fusion-join both oriented base film layers in a mitre form at their cut edges and a neighborhood thereof.

In this case, a protruding amount of the fusion-joint portion between the mutual oriented base film layers from the other film portion may be about 50-800 µm.

For example, when the laminate film is applied to a continuous filling and packaging apparatus for the material to be packed, the joint portion is run out at a filling space side for the material to be packed or at a state of protruding into an inside of a packaging bag to be produced by folding the film into two in a widthwise direction. When the joint portion of the laminate films existing at their folded free end portions and extending in the widthwise direction of the film passes between a pair of rotating longitudinal seal knifes, sufficient heat fusion among a folded of the protruding joint portion onto a sealant layer of, for example, a back-side laminate film, the sealant layer and a sealant layer of the joint portion opposite thereto is carried out.

Furthermore, another side sealant layer of the joint portion still exposed by such a heat fusion of the joint portion is sufficiently heat-fused to a sealant layer of the other free end portion of the laminate film, so that the resulting longitudinal heat seal portion can ensure the airtightness and heat seal strength as is expected. Therefore, the joint portion can sufficiently contribute to liquid-tight and airtight formation of the packaging bag.

They are true even when the joint portion of the oriented base film layer overlaps with a lateral heat seal portion of the packaging bag.

Under such a coupling structure of the laminate films according to the invention, steady operation of the packaging apparatus can be continued even when a fastened portion of the film is existent. Even in the thus obtained packaging bag including the fastened portion, the material to be packed can be adequately packaged, so that there can be sufficiently removed fears such as deficiency or impossibility of the heat seal, scattering and leaking of the material to be packed and the like.

Therefore, even when the fastened portion of the film passes through the heat seal knife of the packaging apparatus or the like, it is useless to temporarily stop heat-sealing function part, filling function part and the like and hence the improvement of operation efficiency, efficiency and yield of material are realized.

Such an improvement of the material yield becomes more conspicuous when the fitting of front and rear patterns at the joint portion is carried out in case that the laminate films have a printed pattern or the like.

Incidentally, in case of a laminate film consisting of a biaxial-oriented nylon film layer having a thickness of 15 μm as an oriented film layer and a polyethylene layer having a thickness of 50 μm as a sealant layer, when two laminate films are fused by using an impulse sealer, a joining strength between both the nylon film layers is about 5N per a width of 15 mm, which is a value fairly larger than a tension of about 3.5 N per a width of 100 mm acting to the laminate film in the packaging apparatus in the running-out from a wound roll-shaped film, so that the laminate film run-out from the wound film never cause an unexpected breakage or the like at the joint portion of the nylon film layer.

In the coupled structure of the laminate films as mentioned above, the fusion-joint portion of the oriented base film layer is preferable to be arranged so as to extend obliquely with respect to the widthwise direction of the laminate film.

This can shift the extending position of the fusion-joint portion to the extending direction of the longitudinal heat seal portion between a front portion and a rear portion of a packing bag when the laminate film is folded into two in the widthwise direction and the free end portions overlapped with each other are subjected to longitudinal heat sealing and to lateral heat sealing at intervals in a longitudinal direction of the film fill and package the material to be packed, whereby stress concentration or the like can be advantageously prevented to enhance the strength of the packaging bag as compared with a case that the joint portions are positioned between both portions to overlap with each other.

Preferably, the mitre-shaped fusion-joint portion of the oriented base film layer is folded toward the one laminate film side, and then mutually opposite sealant layers, i.e. the sealant layer of the mitre-shaped joint portion and the sealant layer of the one laminate film are previously joined to each other.

This joining can be carried out by heat-fusing both the sealant layers through heat sealing.

According to such a coupling structure, the joint strength between both the films can be enhanced to about 35 N per width of 15 mm under the same lamination structure as mentioned above, so that even if an unexpected dynamic load is applied to the fastened portion of the film, the breakage of the film or the like can be sufficiently prevented at such a fastened portion.

The coupling apparatus of the laminate film according to the invention is an apparatus of coupling end portions or side portions of laminate films each comprising a thermoplastic oriented base film layer and a sealant layer, which comprises a pair of bases positioned at an interval permitting an insertion of each end portion of side portion of the laminate film, at least one pusher arranged on the one base between both opposite bases so as to push the end portion or side portion of the laminate film toward the side of the other base, and upper and lower sealers arranged on the other base at a position corresponding to the pusher.

In this apparatus, the each end portion of, for example, the laminate film is inserted between the pair of the bases at a posture of facing the oriented base film layers to each other, while the oriented base film layers are fused and joined to each other in a mitre form by the lower sealer under a press through the pusher, and then the mutually opposite sealant layers are fused to each other by the upper sealer under a press through the pusher at a posture of folding the joint portion between the mutual oriented base film layers toward the side of the one laminate film, whereby the rear end of one laminate film and the front end of the other laminate film can be coupled to each other with a high airtightness and liquid tightness without using a coupling material such as an adhesion tape or the like. Also, the coupled portion is contributed to the formation of a packaging bag under an action of the exposed sealant layer likewise the other portion of the laminate film and a tensile strength required in the laminate film can be given to the coupled portion. For this end, even when the coupled portions are run out from the wound film in the filling and packaging of the material to be packed, the steady operation of the packaging apparatus can be continued to continuously produce a packaging bag filled with the material to be packed.

Moreover, the folded posture of the joint portion between the mutual oriented base film layers toward the side of the one laminate film can be surely realized by forming the mitre-shaped joint portion and pulling up the other laminate film toward the upper side at a given base interval such as 1-5 mm, preferably 2-3 mm to delay the pulling of the joint portion based on friction between the mitre-shaped joint portion and the base. Also, the fusion between mutual sealant layers corresponding to each other through such a folding can be carried out by functioning the upper side sealer under an action of sufficient pushing force through the pusher, whereby the occurrence of protrusion resulted from the folding fusion can be sufficiently prevented.

Therefore, the efficiency of the filling and packaging operation and the efficiency and the yield of the material can be largely improved as compared with the conventional technique requiring the temporary stop of the main function parts or the like in the packaging apparatus every the running-out of the coupled portion of the laminate film.

In such an apparatus, it is preferable that the sealer arranged downside is a cutting sealer and the sealer arranged upside is a fusion sealer.

According to this arrangement, when all of the laminate films are made of a thermoplastic resin material, the fusion joining between the oriented base film layers is carried out by the cutting sealer, whereby the length of the mitre-shaped joint portion of the oriented base film layer can be made to a required and minimum one, so that when the sealant layers are fused to each other at the folded posture, the width of the fused portion can be made to about a line and hence the influence of the fused portion upon the formation of the packaging bag can be made minimum s far as possible.

In the insertion of the end portions of the laminate films between both the bases, when both end portions of these films are precisely positioned in correspondence to the lower sealer, the length of the mitre-shaped joint portion can be sufficiently shortened without rendering the lower sealer into the cutting sealer.

It is preferable to arrange an elastic tube or a cylinder conducting at least forward displacement, preferably both forward and backward displacements of the pusher.

In this case, the forward running of the pusher and hence the pushing of the end portion of the laminate film toward the other base side can be realized by expansion of the tube based on the supply of a pressurized fluid to the elastic tube or forward displacement of a piston rod based on the pressurized fluid to the cylinder. In the former case, the structure is made simple and the equipment cost and running cost are decreased and the maintenance control can be facilitated as compared with the case of using a reciprocal driving means such as cylinder or the like.

Moreover, when the backward displacement of the pusher is carried out accompanied with the shrinkage deformation of the elastic tube or the backward movement of the piston rod by joining and coupling the pusher to the elastic tube or the piston rod, the insertion of the laminate film between both the bases can be conducted smoothly and easily.

Also, the construction of the apparatus can be made simple by combining the pusher with the upper and lower sealers.

On the other hand, when the pusher is arranged so as to correspond each of the upper and lower sealers, the lower side pusher is functioned to the fusion joining of the oriented base film layer, while the upper side pusher can be successively functioned to the folding fusion of the fusion joined portion thereof. For example, when the lower side sealer is a cutting sealer, the oriented base film layers are fusion-joined under an action of the pusher corresponding thereto, and thereafter the fusion joined portion is pulled up to the upper side fusion sealer without displacing the pusher backward, whereby an extra length can be surely removed from the fusion joined portion.

Moreover, in order to locate the joint portion after the fusion joining of the oriented base film layers at a position corresponding to the upper side sealer, it is preferable to pull up either one of the laminate films up to a height restrained by a positioning gauge at a state that the positioning gauge is inserted between the pair of bases and between the respective laminate films.

In this apparatus, a positioning means for the laminate film is arranged on an upper face side of each of the bases and a length of the end portion of the respective laminate film to be inserted between the bases is specified by such a positioning means, whereby the matching of the laminate films having a printed pattern or the like at the coupled portion can be conducted simply and easily.

Further, a cutting means of the laminate film such as a shear part can be arranged at a position beneath the pusher and the sealer in such a coupling apparatus.

This apparatus is effective to not only a case that the all laminate films are comprised of thermoplastic resin layers but also the use of the laminate film having a non-thermoplastic resin layer of an aluminum foil, a paper or the like as a middle layer. After the mitre-shaped fusion joining between the mutual oriented base film layers, both the laminate films are cut below the joint portion to remove the middle layer or the like, whereby an extra portion followed to the joint portion can be surely removed, so that a fusion width of the joint portion through subsequent folding fusion is made constant and the influence of such a folding fused portion upon the packaging operation can be made sufficiently small.

Moreover, the lower sealer can be rendered into either of the cutting sealer and the fusion sealer. In the latter case, the accidental exposure of the middle layer can be surely prevented to more beautifully finish the coupled portion.

Although the above is explained with respect to the case that the rear end portion and the front end portion of the two laminate films are coupled to each other, this is also true in the case of coupling a side portion of the one laminate film and a side portion of the other laminate film to each other.

BEST MODE FOR CARRYING OUT THE INVENTION

Figure 1:
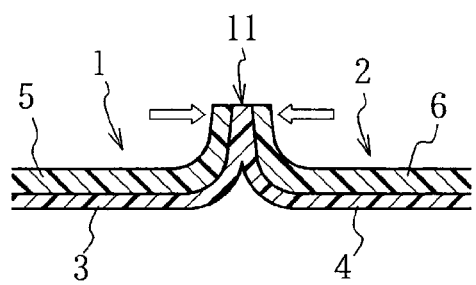
FIG. 1 is an enlarged section view illustrating a coupled structure of films according to the invention.

FIG. 1 is an enlarged section view illustrating a coupled portion of films according to the invention, wherein numerals 1, 2 are laminate films for packaging.

Each of these laminate films 1, 2 comprises an oriented base film layer 3, 4 made of a thermoplastic resin material and a sealant layer 5, 6 directly laminated on the oriented base film layer 3, 4. In this case, a mitre-shaped joining between the oriented base film layers 3, 4 is carried out by coupling a rear end portion of the one laminate film 1 with a front end portion of the other laminate film 2.

Such a joining between both the base film layers 3, 4 may be conducted by interposing an adhesive between both the layers, but it is preferable that in order to conduct the joining at a sufficient strength without using a special coupling or joining material, the fusion of the base film layers is conducted while restraining heat shrinkage of both the layers by violently heating the base film layers 3, 4.

For this end, when both the laminate films 1, 2 are fusion-cut at a state of overlapping the oriented base film layers 3, 4 in opposition to each other, it is preferable to heat-fuse both the base film layers 3, 4 to each other at a cut edge and a neighborhood thereof.

Figure 2A:
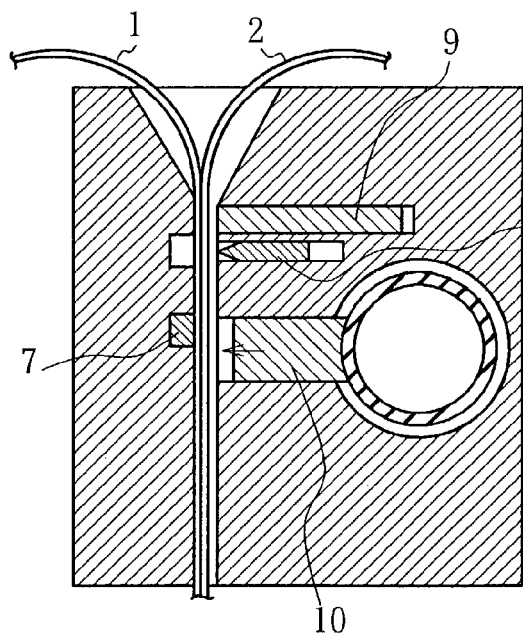
FIGS. 2(a) and 2(b) are section views ideas illustrating a fusion step of an oriented film layer.
Figure 2B:
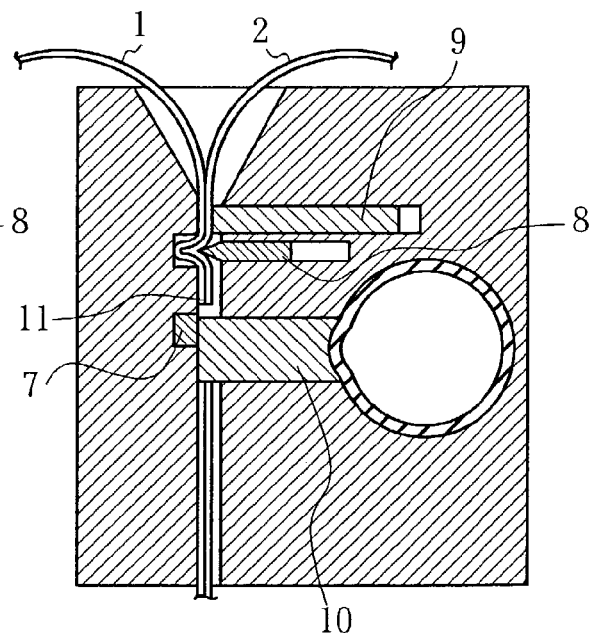

FIG. 2 is a section view ideally illustrating such a fusion step in case of using an impulse sealer. In this case, end portions of both the laminate films 1, 2 are arranged ahead an impulse sealer 7 at a given opposed posture as shown in FIG. 2(a) or at a mitre posture in the illustrated embodiment and the laminate films 1, 2 are fused by instantaneously heating through an action of the impulse sealer 7 by application of impact current, and a pushing plate 8 is forwarded at substantially the same time as in the fusion as shown in FIG. 2(b) to force flexible deformation of the films 1, 2 under the clamping of the films 1, 2 previously acted by a clamper 9, whereby both the films 1, 2 are cut at an upper edge of the fused portion and also the thus cut edge portion is separated away from the impulse sealer 7 to conduct cooling and curing to fusion-join the mutually opposite oriented base film layers 3, 4.

Moreover, numeral 10 is a pusher pushing the two laminate films 1, 2 toward the front face thereof prior to the operation of the impulse sealer 7.

The thus formed mitre-shaped fusion joint portion 11 of the oriented base film layers 3, 4 has a sufficiently large joining strength as compared with tension acting to the laminate film 1, 2 in the packaging apparatus, and can pass between longitudinal seal knifes in a continuous filling and packaging apparatus for a material to be packed as it is, and also liquid tightness, airtightness and heat sealing strength required in a packaging bag can be developed by such a passing.

Figure 3A:
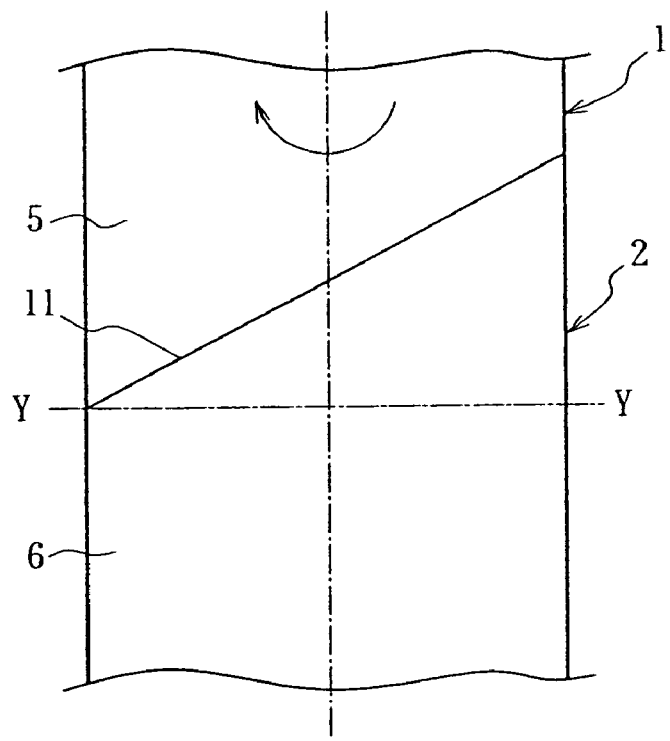
FIGS. 3(a) and 3(b) are schematic views illustrating an example of slantly existing a joint portion.
Figure 3B:
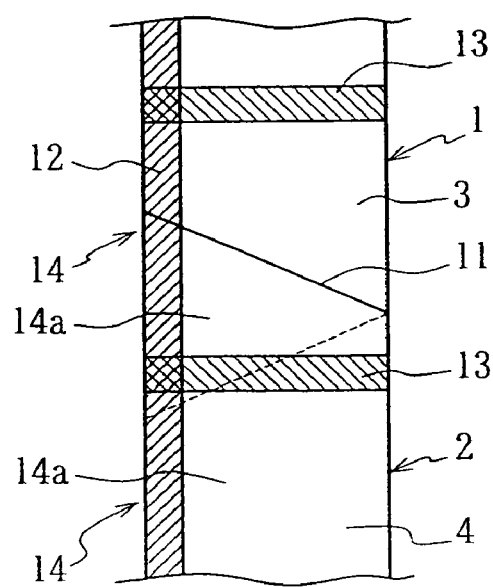

As shown in FIG. 3(a), it is preferable that the fusion joining portion 11 is extended so as to somewhat incline with respect to a widthwise direction Y-Y of the laminate film 1, 2. In such a joint portion 11, the mutually coupled laminate films 1, 2 are applied to the packaging apparatus and folded into two in the widthwise direction as shown in FIG. 3(b), and at such a state longitudinal heat seal portion 12 is formed at both free end portions and lateral heat seal portion 13 is formed at intervals in a longitudinal direction of the film to conduct the filling and packaging of the material to be packed, wherein the extending position of the joint portion 11 can be shifted between front face portion 14a and rear face portion of a packaging bag 14 to be produced to an extending direction of the longitudinal heat seal portion 12.

As a result, stress concentration in a specified place of the packaging bag 14 or the like can effectively be prevented to enhance the tear strength of the packaging bag 14.

Usually, the packaging bag 14 having the joint portion 11 is disposed after the production of the packaging bag 14 from a viewpoint of the appearance, so that it is not required to have a higher strength equal to the packaging bag as a product, and is sufficient to have a strength capable of preventing leakage, scattering and the like of the material packed in the bag without causing the breakage of the bag until the completion of the filling and packaging.

Figure 4:
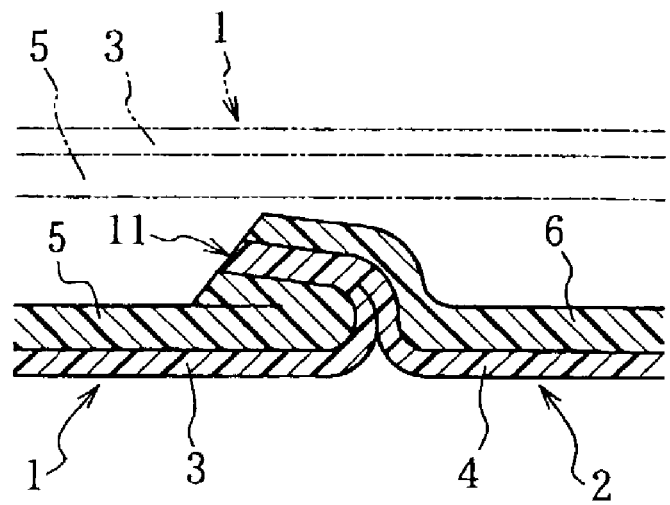
FIG. 4 is an enlarged section view illustrating another coupled structure.

FIG. 4 is an enlarged section view illustrating another embodiment, in which the joint portion 11 between the oriented base film layers 3, 4 as mentioned in FIG. 1 is folded toward the side of the laminate film 1 and the sealant layer 5 of the film 1 is opposed to the sealant layer of the fusion joint portion 11 and then these sealant layers are fusion-joined by, for example, heat sealing.

According to such a coupling structure between the laminate films 1, 2, the joining strength at the coupled portion of the films can be further enhanced, and also the more excellent liquid tightness and airtightness can be provided.

Even in this case, the fusion joint portion 11 is preferable to be extended obliquely with respect to the widthwise direction of the laminate film 1, 2. Thus, when the longitudinal sealing is applied to both free end portions of the laminate film, as shown by a phantom line in FIG. 4, the joint portion is not existent in a free end portion of, for example, the laminate film 1 joined to the joint portion 11 and also unevenness is not existent in the heat sealed surface, so that the reliability of the longitudinal heat seal is enhanced and further excellent airtightness or the like is ensured and hence a higher heat sealing strength can be realized.

Figure 5:
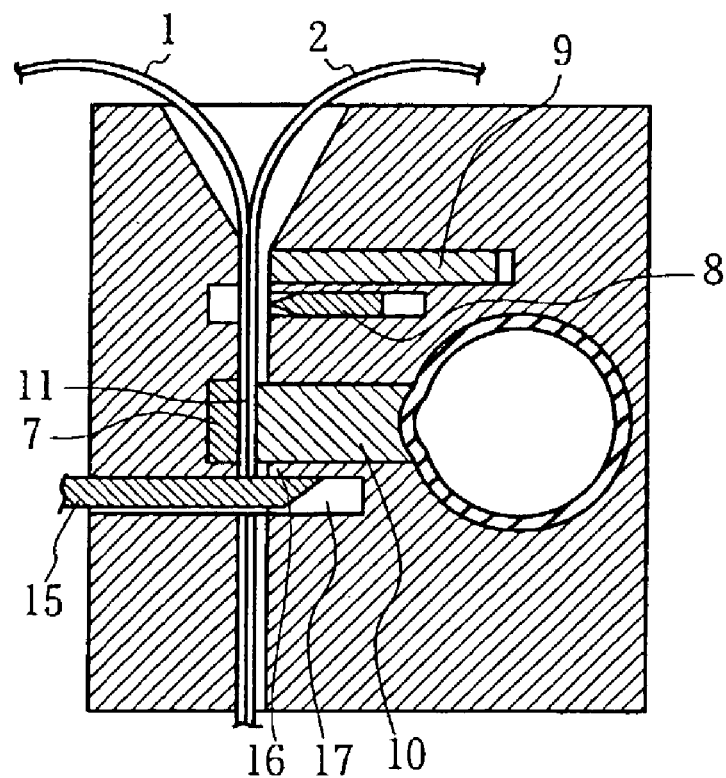
FIG. 5 is a section view illustrating a fusion cutting step.

When the laminate film 1, 2 is provided with a middle layer not cutting by the impulse sealer 7 such as aluminum foil, paper or the like, as shown in FIG. 5, it is preferable to arrange a shearing means comprising a shear knife 15 horizontally forward-moving from one base portion to the other base portion adjacent to a lower side of the impulse sealer 7 and the pusher 10, and a receiving depression 17 formed in the other base portion and defining a receiving knife 16 contributing to shearing of an end portion of the film in collaboration with the shearing knife 15. In this case, even if the impulse sealer 7 as a cutting sealer is changed into the other fusion sealer in addition to the use of the impulse sealer, after the mutual mitre-shaped joining of the oriented base film layers 3, 4, end portions of the films continued thereto can be surely cut at a given position. For instance, the folded fusion of the joint portion 11 between the oriented base film layers 3, 4 as shown in FIG. 4 can be always conducted at a constant fusion joining form.

Incidentally, the laminate films having the following lamination construction are fusion-joined by using the impulse sealer or the like and adopting two coupling methods shown in FIG. 6 (a: mitre joining, b: mitre folded joining), and the tensile strength of the coupled portion is measured to obtain the following results.

Construction of Laminate Film

① $NY^{15}/XA\text{-}S^{50}$

② $PET^{12}/D/\text{aluminum deposited } PET^{12}/XA\text{-}S^{40}$

③ $NY^{15}/D/Al^{7}/XA\text{-}S^{50}$ wherein
- NY$^{15}$: biaxially oriented nylon film layer (15 μm)
- XA-S$^{50}$: polyethylene layer based on a metallosene catalyst system (50 μm)
- PET$^{12}$: biaxially oriented polyethylene terephthalate film layer (12 μm)
- D: adhesion layer through dry lamination
- XA-S$^{40}$: polyethylene layer based on a metallosene catalyst system (40 μm)
- Al$^{7}$: aluminum foil (7 μm)

Figure 6A:
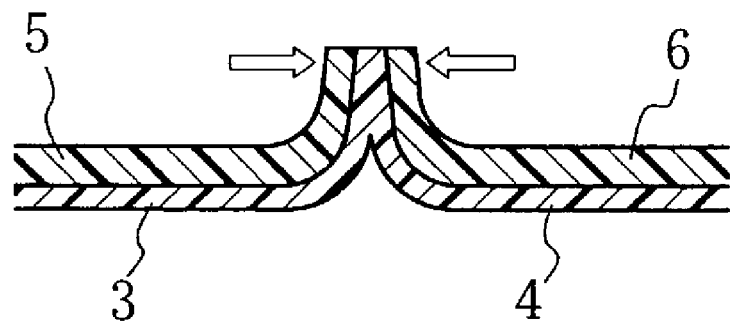
FIGS. 6(a) and 6(b) are schematic views illustrating a method of coupling films in an example.
Figure 6B:
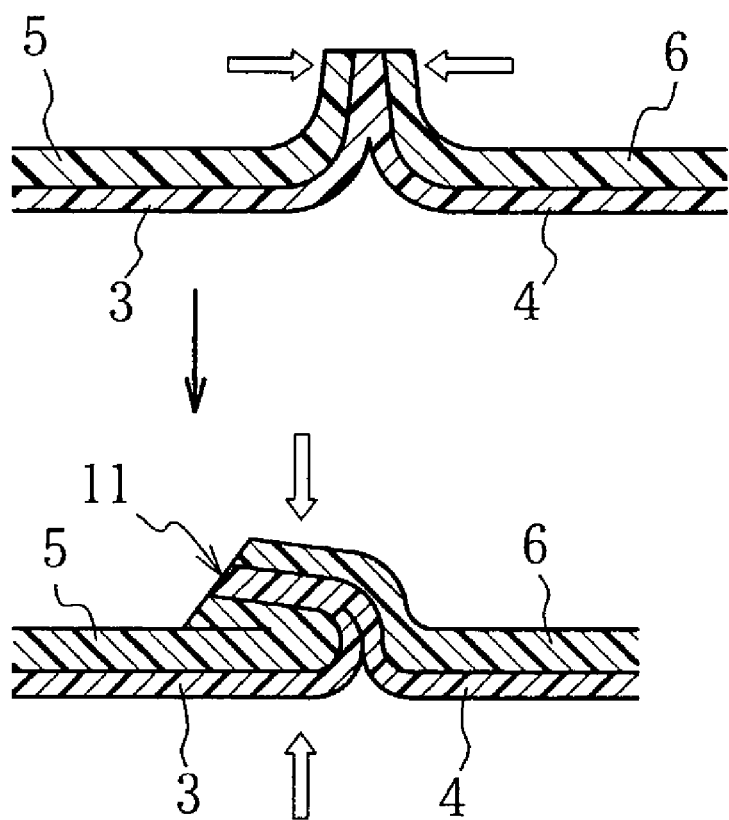

Joining Method a: mitre joining: As shown in FIG. 6(a), the oriented base film layers are hot-cut and sealed in form of a mitre under pressure.

b: mitre folded joining: As shown in FIG. 6(b), the oriented base film layers are hot-cut and sealed in form of a mitre under pressure, and then the mitre sealed portion is folded and the sealant layers are heat-sealed under pressure.

Report of Test Results

At first, the joining methods a and b are carried out by using the laminate film ①. A relationship between the joining method and tensile strength is shown in Table 1. As seen from the results of Table 1, the strength is higher in the joining method a than the joining method b.

TABLE 1

| Joining method | Value of tensile strength [N/15 mm width] |
|---|---|
| a | 5.19 |
| b | 34.50 |

Then, tensile strengths of the laminate films ①-③ and tensile strengths of joint portions by the joining methods a, b are shown in Table 2.

TABLE 2

| Laminate film | Tensile strength [N/15 mm width] | | |
|---|---|---|---|
| | Film *1 | Joining method a | Joining method b |
| ① NY$^{15}$/XA-S$^{50}$ | 64.48 | 5.19 | 34.50 |
| ② PET$^{10}$/D/aluminum deposited PET$^{12}$/XA-S$^{40}$ | 76.54 | 5.10 | 45.18 |
| ③ NY$^{15}$/D/Al$^{7}$/XA-S$^{50}$ | 63.80 | 11.27 | 43.90 |

*1: Tensile strength of the laminate film itself cut into a strip of 15 mm in width In the above laminate film construction, all of them show that the value of the tensile strength in the joint portion is larger in the joining method b than in the joining method b.

Figure 7:
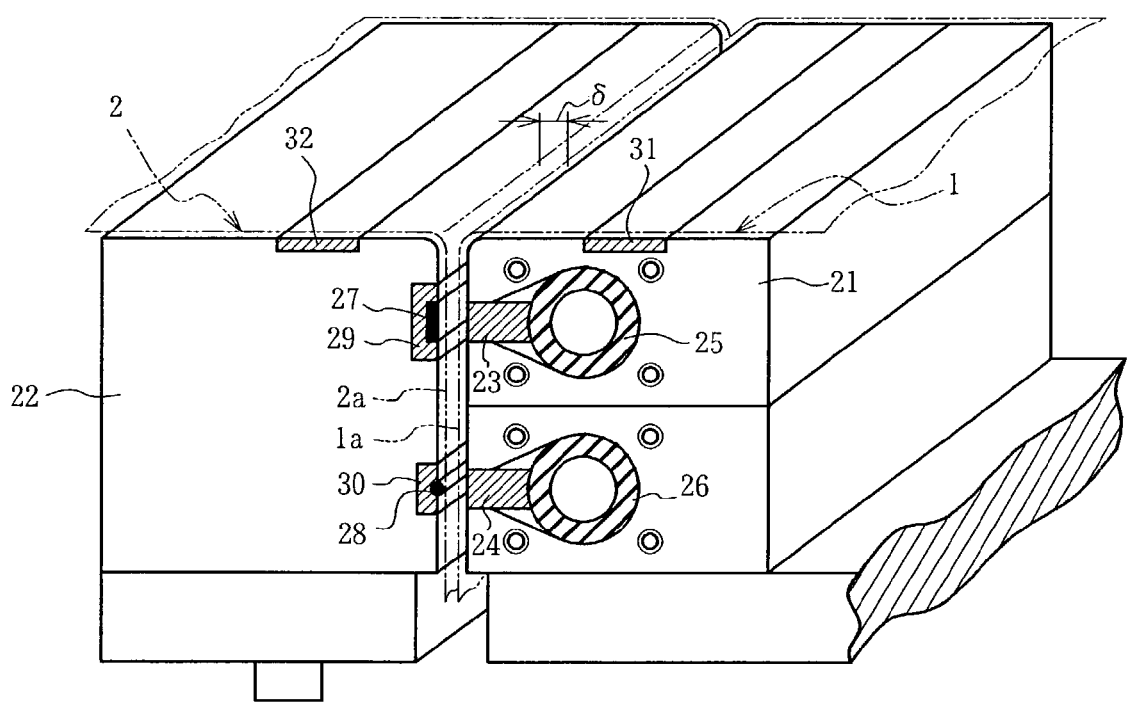
FIG. 7 is a sectional perspective view illustrating an apparatus according to the invention.

FIG. 7 is a sectional perspective view illustrating an embodiment of the apparatus according to the invention suitable for carrying out the folded joining as mentioned above, in which numerals 21, 22 are a base pair.

The bases 21, 22 are the same plane in their upper faces and extend in parallel to each other at an interval δ permitting insertion of, for example, front end portion 1a and rear end portion 2a of the respective laminate films 1, 2.

At the one base 21 in the mutually opposite portions of the bases 21, 22 are arranged pushers 23, 24 pushing end portions 1a, 2a of the films toward the other base 22 at intervals in up-down directions over substantially a full length so as to forward, for example, in a direction substantially perpendicular to the opposite base face, and elastic tubes 25, 26 pushing these pushers 23, 24 in forward direction are arranged at rear face sides. Each of the elastic tubes 25, 26 shown at a shrunk state are arranged in a base depression specifying an expansion form, and the pushers 23, 24 each made of an elastic material, a metallic material or the like are pushed onto the opposite base face side by a required force through the expansion based on the supply of pressurized fluid into the elastic tube 25, 26. Moreover, when the pusher 23, 24, is integrally united with the elastic tube 25, 26 by joining or the like, the pusher 23, 24 can be moved backward accompanied with the shrinkage deformation of the elastic tube 25, 26.

Also, the pushers 23, 24 are possible to be one-piece body forward moving with one elastic tube.

In the other base 22 are arranged two upper and lower sealers 27, 28 at positions corresponding to the respective pushers 23, 24. Each of these sealers 27, 28 may be any one of a heat sealing system, an impulse sealing system, a high frequency welder sealing system, a supersonic sealing system and a laser system, but it is preferable that the sealer 28 arranged at a lower side is a hot-cutting sealer and the sealer 27 arranged at upper side is a fusion sealer. That is, when the oriented base film layers 3, 4 of the laminate films 1, 2 are fusion-joined to each other in a mitre form by the lower sealer 28, it is preferable that an extra portion continued beneath the joint portion is removed by fusion in order to shorten the length of the joint portion in subsequent folding.

In the illustrated embodiment, the upper and lower sealers 27, 28 are impulse sealing systems, and the upper sealer 27 is, for example, a plate of 5 mm in width and the lower sealer 28 is, for example, a rod of 1 mm in diameter, and these sealers 27, 28 are electrically insulated to the base 22 through insulating bodies 29, 30.

Figure 8A:
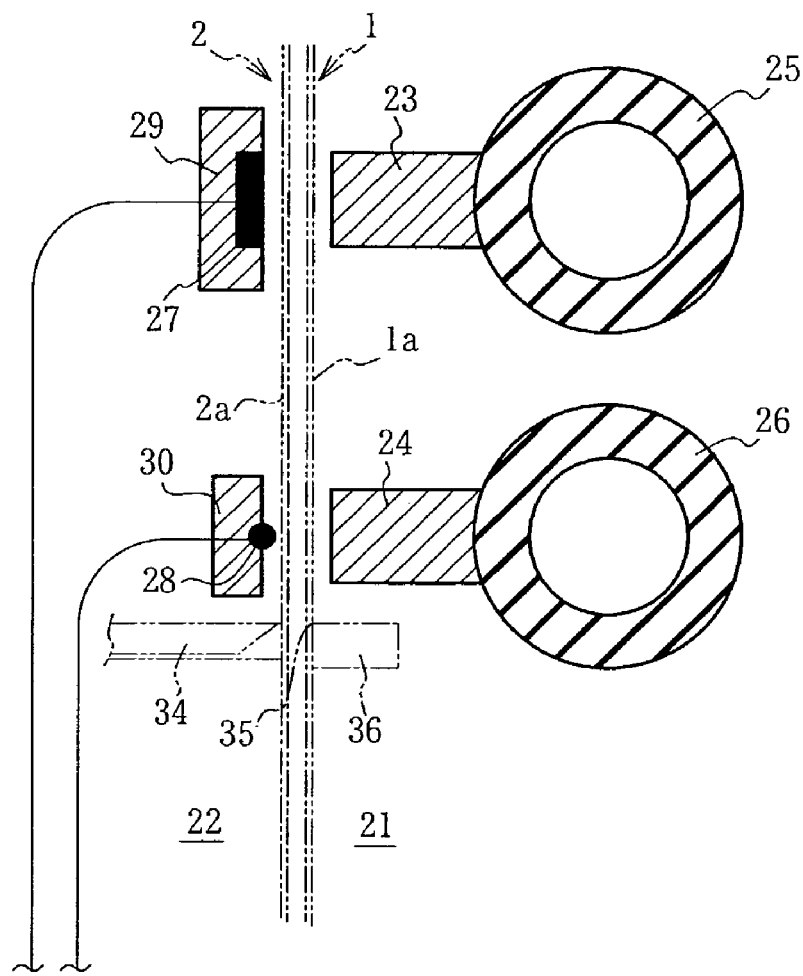
FIGS. 8(a) and 8(b) are section views illustrating an embodiment of arranging a cutting sealer.
Figure 8B:
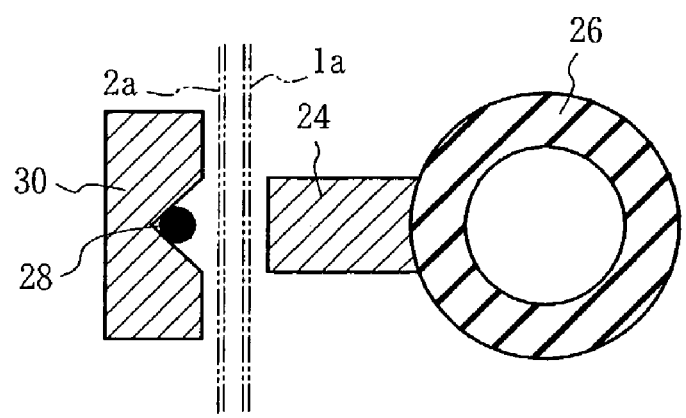

Moreover, the lower sealer 28 as a hot-cutting sealer can directly contact with the film end portions 1a, 2a by arranging so as to protrude from an insulating body 30 as shown in FIG. 8(a). Also, as shown in FIG. 8(b), it is arranged so as to somewhat backward from the surface of the insulating body 30, whereby the film end portions 1a, 2a can be hot-cut and sealed through a radiant heat from the sealer 28. In the latter case, there is no fusion of the hot-cut film portion to the sealer 28, so that beautiful hot-cutting can be always and surely be conducted.

In this case, the hot-cut sealing is carried out under a sufficient pushing of the pusher 24 onto the film end portions 1a, 2a and the heating, hot-cut sealing and cooling are conducted by the impulse sealing method for a short time, so that the heat shrinkage of the thermoplastic oriented base film layers can be sufficiently prevented and also the oriented base film layers can be sufficiently fused to strongly adhere to each other.

In the apparatus having the above structure, it is preferable to arrange positioning means of the laminate films 1, 2 magnets 31, 32 in the illustrated embodiment on the upper faces of the bases 21, 22. Moreover, when the magnets 31, 32 are arranged so as to embed in the bases 21, 22, it is required to use a steel rod or other sandwiching member for fixing the respective laminate film 1, 2 in sandwich form, but when the base itself is made of steel or the like, the magnet can be used as a sandwiching member.

In any case, it is effective to arrange a measuring means for measuring a length of the end portion 1a, 2a, of the laminate film 1, 2 or the like on the base 21, 22 in order to match with a printed pattern or the like.

Figure 9A:
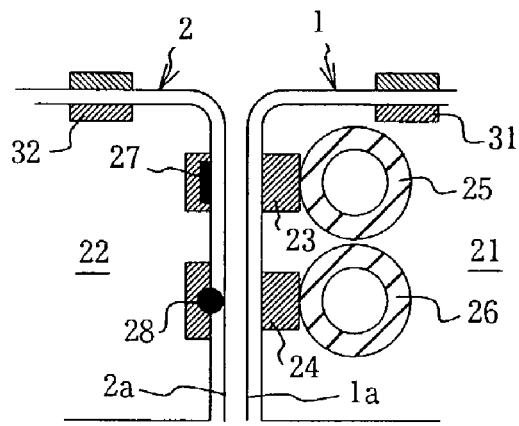
FIGS. 9(a), 9(b) and 9(c) are section views illustrating a step of coupling laminate films to each other.
Figure 9B:
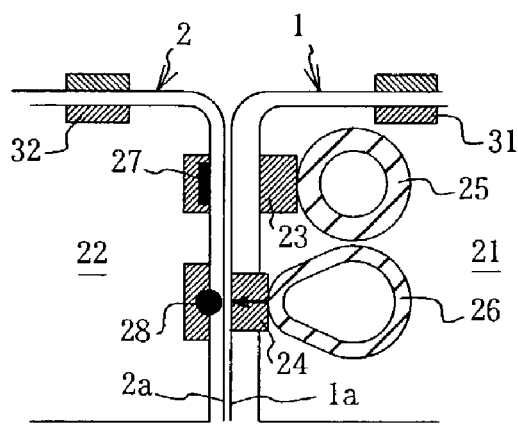
Figure 9C:
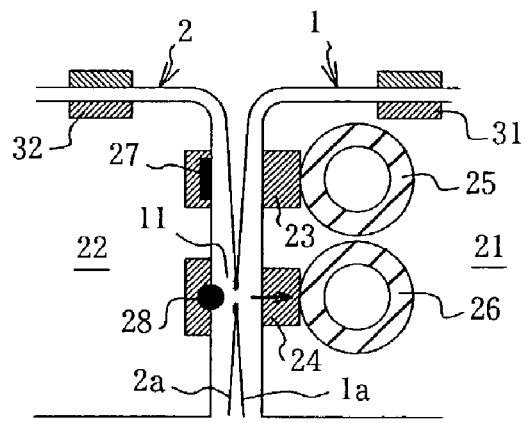

When the front end portion 1a and rear end portion 2a of the laminate films 1, 2 each comprising a thermoplastic oriented base film layer such as biaxially oriented nylon film layer, biaxially oriented ethylene-vinyl alcohol copolymer film layer or the like and a sealant layer such as various polyethylene layer, ethylene-vinyl acetate copolymer layer, non-oriented polypropylene, ethylene-acrylic acid copolymer layer, ionomer layer or the like are coupled to each other by using the apparatus having the above structure, given lengths of the respective end portions 1a, 2a are inserted between both the bases at a posture that the oriented base film layers are opposed to each other under the positioning action of the magnets 31, 32 as shown in FIG. 9(a), and both the film end portions 1a, 2a are pushed onto the sealer 28 by the lower pusher 24 as shown in FIG. 9(b), and the mutual oriented base film layers 3, 4 are fusion-joined in a mitre form under an action of the sealer 28 to provide a hot-cut seal as shown in FIG. 9(c).

Then, the pusher 24 is moved backward as shown in FIG. 9(c) or it is not moved backward, and the film rear end portion 2a is pulled up from both the bases 21, 22, preferably until it is restrained by the positioning gauge 33 inserted between both the end portions 1a, 2a, whereby the fusion joint portion 11 between the oriented base film layers 3, 4 is precisely positioned in correspondence to the upper fusion sealer 27.

In this case, the fusion joint portion 11 is necessarily delayed by friction with the base 22 accompanied with such pulling-up to render into a posture of folding to the front end portion 1a of the film 1.

Figure 10A:
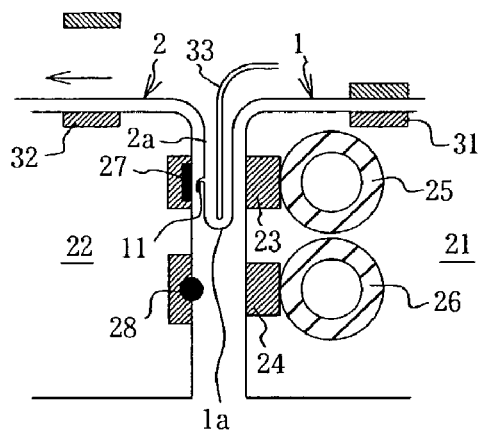
FIGS. 10(a), 10(b) and 10(c) are section views illustrating another step of coupling laminate films to each other.
Figure 10B:
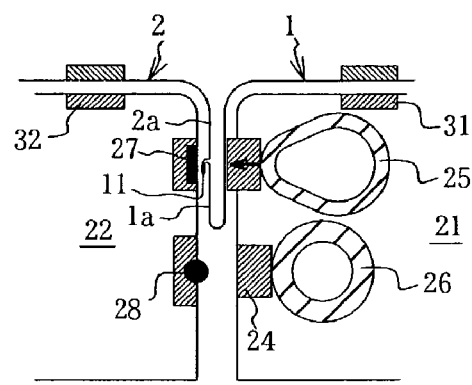
Figure 10C:
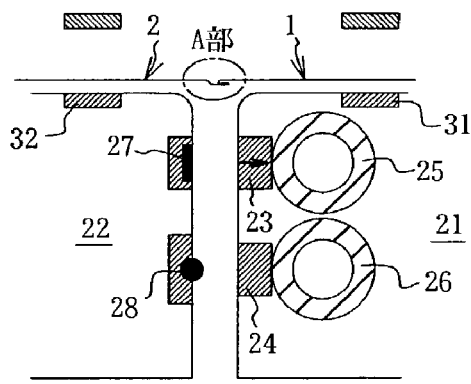

Thereafter, the upper pusher 23 is moved forward under the taking-out of the positioning gauge 33 as shown in FIG. 10(b) to sufficiently adhere the sealant layer in the fusion joint portion 11 to the sealant layer of the film front end portion 1a, while both the sealant layers are sufficiently fused under the action of the fusion sealer 27 to conduct of both the laminate films 1, 2 as it is expected. Finally, both end portions 1a, 2a are taken out between the bases 1, 2 to complete a series of the coupling operations as shown in FIG. 10(c).

Figure 11:
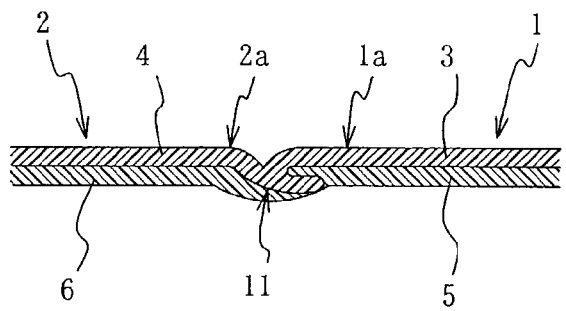
FIG. 11 is a diagrammatically enlarged section view of a coupled portion.

FIG. 11 shows an enlarged section of the thus formed film coupled portion, in which numerals 3, 4 are oriented base film layers and numerals 5, 6 sealant layers.

The coupled portion between the mutual laminate films can indicate a high joining strength in addition the excellent airtightness and liquid tightness.

Furthermore, the coupled portion contributes to the formation of the packaging bag under an action of the sealant layer exposed to the other side of the fusion joint portion 11 likewise the other portions of the laminate films 1, 2 and can sufficiently realize a tensile strength required for the packaging bag.

Therefore, when the laminate films having the coupled portion are applied to, for example, an automatic filling and packaging apparatus to manufacture a packaging bag while folding into two in the widthwise direction and heat-fusing sealant layers at both free end portions through the longitudinal heat sealing knife and continuously or discontinuously filling a material to be packed into the film, it is quite useless to temporarily stop the packaging apparatus even if the film coupled portion arrives at either longitudinal or lateral heat sealing knife.

Incidentally, when the oriented base film layer is a biaxially oriented nylon film layer having a thickness of 15 μm and the sealant layer is a polyethylene layer having a thickness of 50 μm, the tensile strength of the coupled portion is about 35 N per width of 15 mm, which a about a half of the tensile strength of 70 N generally required for the packaging bag, but is a sufficient tensile strength as a film connecting strength in the filling (an optimum film tension in the filling is about 500 mN per 15 mm width).

Figure 12:
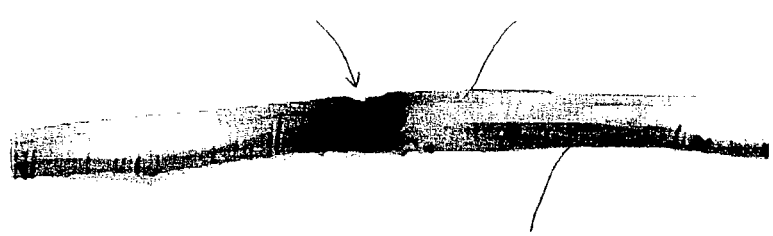
FIG. 12 is an enlarged section view illustrating actual coupled portion of the laminate films at 100 magnifications.
Figure 13A:
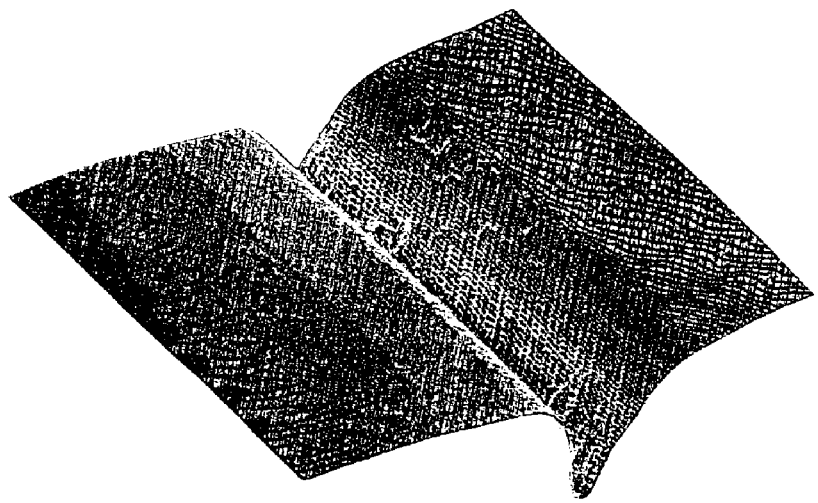
FIGS. 13(a) and 13(b) are enlarged section views of mutual coupled portions having each uneven state in its surface.
Figure 13B:
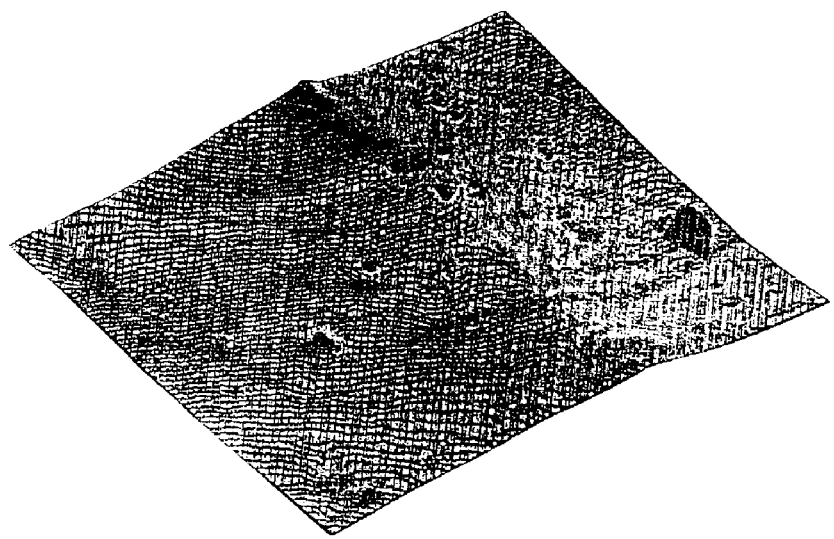

Also, the section of the coupled portion is shown in FIG. 12 as enlargedly viewed by a microscope at 100 magnification. Further, the biaxially oriented nylon film layer face and polyethylene layer face in the coupled portion are shown in FIG. 13(a) and FIG. 13(b), and particularly it is confirmed that trace of the coupling is made small to a negligible extent in the side of the sealant layer.

Now, the extending direction of the above coupled portion is not limited to the widthwise direction of the laminate film 1, 2 but may be extended obliquely with respect to the widthwise direction. In the latter case, as mentioned, for example, in relation to FIG. 3, when the coupled laminate films are folded into two in the widthwise direction and the overlapped free end portion is subjected to the longitudinal heat sealing and the material to be packed is filled and packaged while subjecting to the lateral heat sealing at intervals in the longitudinal direction of the film, the extending position of the coupled portion can be shifted in the extending direction of the longitudinal heat sealed portion between the front face portion and the rear face portion in the packaging bag, so that stress concentration or the like can be advantageously prevented to more enhance the strength of the packaging bag as compared with the case that the coupled portion is overlappedly positioned between both the portions, and also the peeling component force of the coupled portion can be advantageously reduced against the action of tensile force in the extending direction of the film.

In the laminate film according to the invention, not only various film layers but also aluminum foil, paper, various vapor deposited layers, vinylidene chloride copolymer coat layer or other coating layer may be interposed between the oriented base film layer and the sealant layer.

Moreover, if the laminate film 1, 2 is provided with a cut-impossible middle layer such as aluminum foil, paper or the like, it is preferable to arrange a cutting means adjacent to a lower side of the pusher 23, 24 and the sealer 27, 28, for example, a shearing means comprising a shearing knife 34 moving forward from the one base 22 to the other base 21 and a receiving depression 36 formed in the other base 21 and defining a receiving knife 35 contributable to shearing of the film end portion 1a, 2a as shown by a phantom line in FIG. 8(a). According to this means, after the mitre-shaped mutual joining of the oriented base film layers, the film end portion followed thereto is surely cut at a given position irrespectively of the hot-cutting sealer or the fusion sealer as the lower sealer 28, and thereafter the folding fusion of the mutual joint portion of the base film layers can be always carried out under a constant fusion form.

Figure 14:
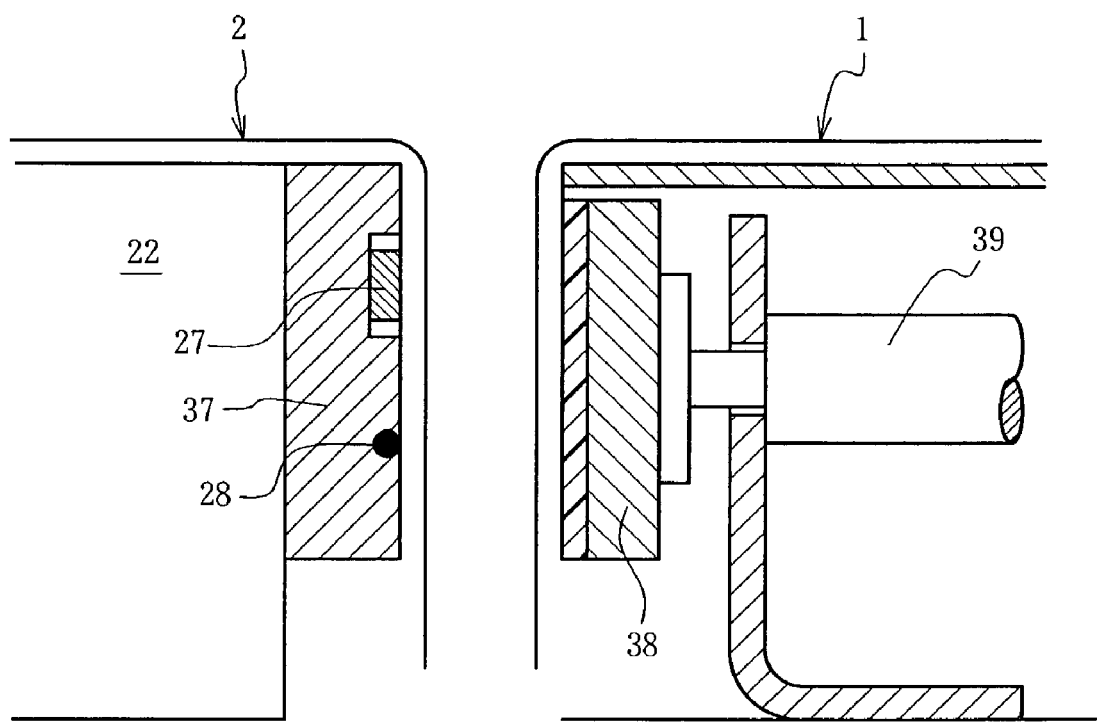
FIG. 14 is an enlarged section view illustrating another example of the pusher mechanism.

FIG. 14 is a schematic section view illustrating another embodiment of the pusher mechanism, in which one pusher 38 is arranged to be common to upper and lower sealers 27, 28 disposed on the insulating body 37. For example, in order to conduct the forward and backward movement of the pusher 38 over about 1500 mm in a direction perpendicular to a face of the figure, plural cylinders 39 are connected to the pusher 38 instead of the elastic tube.

When the size enlargement over full length of the elastic tube is synchronized in a required accuracy, the elastic tube can be naturally adopted even if the length of the pusher 38 is made long.

Even in such an apparatus, the coupled portion as is expected can be formed by alternately acting the sealers 27, 28 under the same steps as previously mentioned.

In any apparatuses, it is preferable to connect a tension means for absorbing liner expansion under the action of the sealers 27, 28 to at least one end of the sealers.

Moreover, the fusion joint portion 11 may be folded toward the side of the laminate film 2 and fused thereto though it is not illustrated.

The above coupling structure can be applied to a case that side portions of two laminate films are coupled to each other in addition to the case that the front end portion of the one laminate film 1 is coupled to the read end portion of the other laminate film 2.

Although the invention is explained with respect to a case that laminate films are used in the automatic filling and packaging, it is of course applicable to various laminate films other than those for packaging in addition to those for general packaging bag.

INDUSTRIAL APPLICABILITY

According to the invention, the mutual coupling of the laminate films is carried out without using a connecting material such as an adhesive tape or the like, whereby not only the excellent airtightness and liquid tightness but also the high coupling strength can be obtained, and the film coupled portion obtained by joining the oriented base film layers to each other can be passed through the packaging apparatus under steady operating state of the apparatus without temporarily stopping the main functional part thereof and so on likewise the other portions of the laminate films, so that the operation efficiency and the efficiency can be largely improved as compared with the conventional technique that the temporary stop and reoperation of the packaging apparatus are repeated every the arrival of the coupled portion at the heat sealing knife or the like and also the yields of the laminate film and the material to be packed can be largely improved.

The invention claimed is:

1. A packaging bag comprising a coupling structure of laminate films, each laminate film comprising a thermoplastic oriented base film layer and a sealant layer that couple end portions of the laminate films to each other, in which the oriented base film layers are fusion-joined to each other in a mitre form and a protruding amount of the fusion joint portion from the laminate films is about 50-800 μm, the fusion-joint portion of the oriented base film layers extending along the laminate films with respect to an edge of one of the laminate films, wherein the fusion joint portion is configured such that, when viewed from a longitudinal cross-section, a free planar end of the fusion joint portion is inclined obliquely with respect to the width direction of the laminate films.

2. The packaging bag according to claim 1, wherein the fusion-joint portion of the oriented base film layers is folded toward a side of one of the laminate films to join mutually opposed sealant layers with each other.

3. The packaging bag according to claim 1, further comprising:

a longitudinal heat sea portion along at least one of the laminate films; and a lateral heat seal portion along at least one of the laminate films.

* * * * *